US00RE37898E

(19) United States
(12) Reissued Patent
Seragnoli

(10) Patent Number: US RE37,898 E
(45) Date of Reissued Patent: Nov. 5, 2002

(54) SELF-OSCILLATING SWITCHING POWER SUPPLY WITH OUTPUT VOLTAGE REGULATED FROM THE PRIMARY SIDE

(75) Inventor: Giordano Seragnoli, Imbersago (IT)

(73) Assignee: STMicroelectronics S.r.l., Agrate Brianza (IT)

(21) Appl. No.: 09/464,190

(22) Filed: Dec. 16, 1999

Related U.S. Patent Documents

Reissue of:
(64) Patent No.: 5,699,237
Issued: Dec. 16, 1997
Appl. No.: 08/658,278
Filed: Jun. 5, 1996

(30) Foreign Application Priority Data

Jun. 5, 1995 (EP) ..... 95830235

(51) Int. Cl.[7] ..... H02M 3/335
(52) U.S. Cl. ..... 363/19; 363/97; 363/131
(58) Field of Search ..... 363/18, 19, 97, 363/131

(56) References Cited

U.S. PATENT DOCUMENTS 4,092,709 A * 5/1978 Voigt et al. ..... 363/18
4,172,276 A * 10/1979 Kameya ..... 363/19
4,443,838 A * 4/1984 Yamada ..... 363/19
4,467,406 A * 8/1984 Hattori et al. ..... 363/19
4,488,210 A * 12/1984 Slono ..... 363/97
4,710,695 A * 12/1987 Yamada et al. ..... 363/18
4,937,724 A * 6/1990 Nakajima ..... 363/19
5,082,998 A * 1/1992 Yoshioka ..... 363/19
5,168,435 A * 12/1992 Kobayashi et al. ..... 363/20
5,266,881 A * 11/1993 Hoffman et al. ..... 363/18
5,333,104 A * 7/1994 Tamura ..... 363/18
5,369,307 A * 11/1994 Kobayashi ..... 307/125
5,390,100 A * 2/1995 Palata ..... 363/18
5,699,237 A * 12/1997 Seragnoli ..... 363/19

FOREIGN PATENT DOCUMENTS

JP 4359673 * 11/1992 ..... H02M/7/06

* cited by examiner

*Primary Examiner*—Jeffrey Sterrett
(74) *Attorney, Agent, or Firm*—Lisa K. Jorgenson; Bryan A. Santarelli

(57) ABSTRACT

Regulation of the output voltage of a power supply employing a flyback-type self-oscillating DC—DC converter employing a transformer. The primary winding circuit of the transformer senses a current recirculation loop for discharging the energy cyclically stored in an auxiliary winding of the self-oscillation loop of the converter such as to represent a replica of the circuit of the secondary winding of the transformer and by summing a signal representative of the level of the energy stored in the auxiliary winding with a drive signal on a control node of a driver of the power switch of the converter.

32 Claims, 3 Drawing Sheets

*(Amended)*

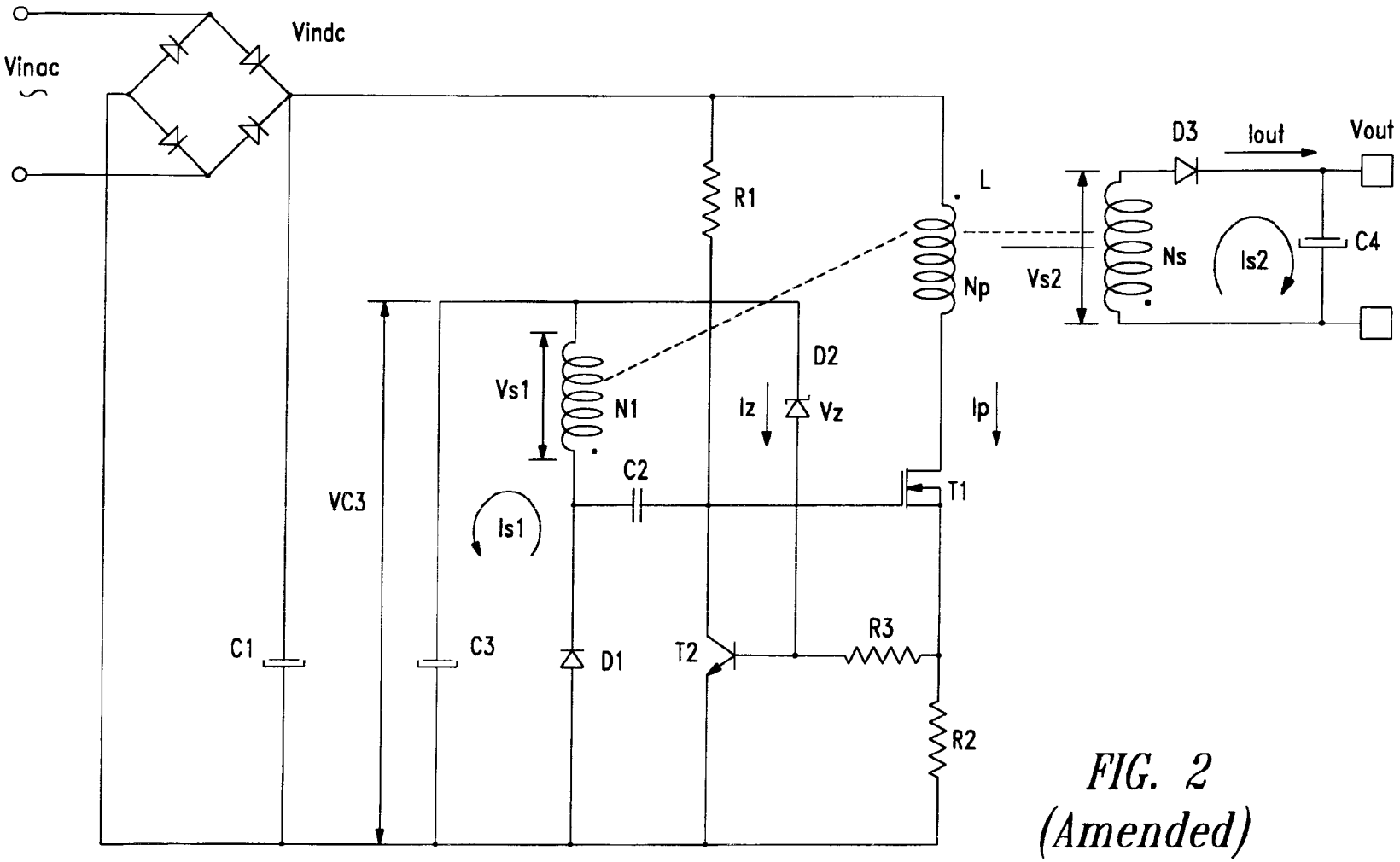
FIG. 2
(Amended)

SELF-OSCILLATING SWITCHING POWER SUPPLY WITH OUTPUT VOLTAGE REGULATED FROM THE PRIMARY SIDE

Matter enclosed in heavy brackets [ ] appears in the original patent but forms no part of this reissue specification; matter printed in italics indicates the additions made by reissue.

TECHNICAL FIELD

A flyback-type self-oscillating DC—DC converter uses the primary winding side circuit of a transformer to regulate the output voltage of a power supply.

BACKGROUND OF THE INVENTION

Switching power supplies offer remarkable advantages in terms of volume, weight and electrical efficiency if compared with traditional transformer-type power supplies functioning at the mains frequency. However, due to the complexity of the electronic circuitry employed, these switching power supplies are rather costly. One of the architectures most frequently used is based on the use of a flyback-type, DC—DC converter.

In a flyback system, energy is stored within the primary winding inductance of the transformer during a conduction phase of a power transistor (switch), functionally connected in series with the primary winding and is transferred to the secondary winding of the transformer during a subsequent phase of non-conduction of the switch, which is driven at a relatively high frequency, for example, by a local oscillator having a frequency in the order of tens of kHz.

In switching power supplies, the voltage at the input of the DC—DC converter is not regulated. Commonly, in a power supply connectable to the mains, the input voltage of the converter is a nonregulated voltage as obtained by rectifying the mains voltage by a Wien bridge and leveling it by a filtering capacitor. Therefore this voltage is a nonregulated DC voltage whose value depends on the mains voltage that can vary from 180 VAC to 264 VAC in Europe and from 90 VAC to 130 VAC in America.

A diagram of a flyback-type, self-oscillating primary side circuit of a power supply connectable to the mains is shown in FIG. 1.

At the turning on instant, the voltage $V_{INDC}$ produces a current i in the resistance R1 that has normally a high ohmic value. This current charges the gate-source capacitance of the power switch T1, which, in the example shown, is an isolated-gate, field effect transistor. The gate-source voltage increases in time according to the following approximate equation:

$$V_{GS} = \frac{i \cdot t}{C_{GS}}$$

where $V_{GS}$ indicates the voltage between the gate and the source of transistor T1. $C_{GS}$ is the gate-source capacitance, i is the current that flows through R1 and t is time.

When the voltage $V_{GS}$ reaches the threshold value $V_{THR}$, the transistor begins to drive a current $I_P$ while the drain voltage $V_{DS}$ decreases because of the voltage drop provoked by the current $I_P$ on the inductance L of the primary winding $N_P$ of the transformer.

Therefore, a voltage equal to $V_{INDC}-V_{DS}$ is generated at the terminals of the primary winding $N_P$. This voltage, reduced according to the turn ratio $N_1/N_P$ between the primary winding $N_P$ and the auxiliary winding $N_1$ belonging to the self-oscillating circuit, is also applied between the gate node G and the common ground node of the circuit through a capacitor C2. This voltage, which is in phase with the voltage present on the primary winding $N_P$, provokes a further increase of the voltage between the gate node G and the source node S of the transistor T1, which therefore is driven to a state of full conduction. Therefore the voltage on the inductance L of the primary winding $N_P$ is approximately equal to the rectified input voltage $V_{INDC}$ and the current that flows through the primary winding of the transformer has a value given by the following equation:

$$I_P = \frac{V_{INDC} \cdot t}{L}$$

On the other hand, the current $I_P$ also flows in the resistance R2 provoking a voltage drop thereon given by $I_P \cdot$R2. Even this voltage drop grows linearly in time until it reaches conduction threshold value $V_{BE}$ of the second (transistor) switch T2.

By entering into a state of conduction, the transistor T2 [shortcircuits toward the ground node and] *reduces the voltage at* the gate node G of the transistor T1, which therefore turns off. Initially the current $I_P$ continues to flow thus increasing the voltage $V_{DS}$ well above the input voltage $V_{INDC}$. Therefore, a flyback voltage develops on the primary winding inductance L that has an opposite polarity to that of the voltage present during a conduction phase of the switch T1. This flyback voltage, reduced in terms of the turn ratio $N_1/N_P$, is also applied between the gate node G of the transistor T1 and the common ground node of the circuit and further contributes to keep the transistor T1 in an off condition, having a negative polarity as referred to the ground potential.

During a *high* conduction phase of the transistor [T1] *T2*, the energy accumulated in the inductance L of the primary winding of the transformer transfers completely into the secondary circuit that is only partially depicted in FIG. 1. This occurs during such an OFF or FLYBACK phase of operation of the transistor T1. When this phase of energy transfer is over, the [voltage] *voltages* on the primary winding $N_P$ and on the winding $N_1$ of the self-oscillation circuit are null and therefore a new cycle can start again.

The above-mentioned system typifies a common flyback architecture where the primary current $I_P$ rises linearly from zero up to a peak value given by the following equation:

$$I_P = \frac{V_{BE}}{R_2} \tag{1}$$

during a conduction phase of transistor T1.

The relevant waveforms of the circuit are shown in FIG. 3.

Upon a variation of the input voltage $V_{INDC}$, the conduction time $T_{ON}$ of transistor T1 varies according to the following expression:

$$T_{ON} = \frac{L \cdot V_{BE}}{V_{INDC} \cdot R_2} = \frac{L \cdot I_P}{V_{INDC}} \tag{2}$$

Therefore, the frequency of oscillation is inversely proportional to the rectified mains voltage.

In the majority of applications, the output voltage must be regulated to make it independent from input voltage variation, in other words from the value of the rectified mains voltage.

Commonly in the majority of applications, control of the output voltage is implemented in the secondary circuit. These regulating use feedback control loops that normally sense the secondary voltage level provide this information to the primary circuit via an electrical isolation device, for example, a photo-coupler. These solutions are very efficient but they are also relatively expensive. Even alternative known solutions implementing an output voltage regulation by regulating the current flowing through the primary winding of the transformer during conduction phase of the switch, imply the realization of one or more auxiliary windings and a remarkable complication of the primary circuit.

SUMMARY OF THE INVENTION

It has now been found a surprisingly simple and effective system for regulating the output voltage through the primary circuit of the transformer of a DC—DC converter. The system of this invention does not require any additional winding because it exploits the auxiliary winding $N_1$ of the self-oscillation circuit for implementing the desired regulation of the voltage output by the secondary circuit of the transformer-type converter.

In practice, the method of this invention consists in realizing a discharge current circulation loop of the energy transferred in the auxiliary winding of the self-oscillation circuit during a phase of conduction of the transistor that switches the primary winding and in summing a signal representative of the level of energy on the control node of a driving stage of the switch to regulate its conduction interval.

Practically, the circulation loop of the discharge current relative to the energy stored in the auxiliary winding of the self-oscillation circuit, reproduces electrically the discharge current circulation loop of the energy that is stored in the secondary winding of the transformer. Through a process of self-redistribution of the energy that is stored in the primary winding inductance during the conduction phase of the switch, the system regulates the energy that is transferred from the primary to the secondary winding of the transformer so as to keep substantially uniform the output voltage that develops on the secondary winding of the transformer. This regulation occurs following a change of the value of the nonregulated input voltage and/or of the current absorbed by the secondary circuit.

The auxiliary winding of the self-oscillation circuit is in phase with the primary winding of the transformer during the switch conduction phase while is in phase with the secondary winding during the following off phase of the switch (flyback phase).

According to an important embodiment of this invention, a power supply includes a self-oscillating DC—DC converter having a power transistor switch connected in series with a primary winding of a transformer that is coupled to an input voltage, and a sensing resistance functionally connected between the switch and a common potential node of the circuit. The switch is driven by a self-oscillating circuit composed of at least an auxiliary winding, magnetically coupled to the primary winding, and a first capacitor that is connectable in series between a control node of the switch and common potential node. A second transistor switch is driven to shortcircuit the control node of the first switch with common potential node, when the current flowing through the primary winding reaches a pre-established level. According to the invention, the circuit includes also a second capacitor at least one diode and at least one zener diode. The second capacitor is connected between the auxiliary winding and common potential node. The diode has the anode coupled to common potential node and a cathode coupled to the intermediate connection node between the auxiliary winding and the first capacitor so as to constitute a discharge current recirculation loop for the energy stored in the auxiliary winding inductance. The zener diode is functionally connected between the intermediate connection node between the auxiliary winding and the second capacitor and a control node of the second transistor switch.

While the current recirculation loop realizes a replica in the primary circuit of the current recirculation loop of the secondary winding of the transformer, by means of the zener diode, a current signal is injected on the control node of the switch connected in series with the primary winding of the transformer so as to regulate the timing of the turning off of the switch by the driver stage, i.e., the interval of conduction of the switch. Through a mechanism of energy self-redistribution, the circuit ensures stability of the voltage, output by the secondary circuit of the converter, when the input voltage and/or the current absorbed from the secondary circuit change, as it will be further demonstrated in the description below.

BRIEF DESCRIPTION OF THE DRAWINGS

The various aspects and advantages of this invention will become more evident through the following description of some important, through non-limitative embodiments and by referring to the annexed drawings.

FIG. 2 shows a basic scheme of a power supply connectable to the mains that employs a self-oscillating, flyback-type DC—DC converter made according to this invention.

DETAILED DESCRIPTION OF THE INVENTION

Figure 1:
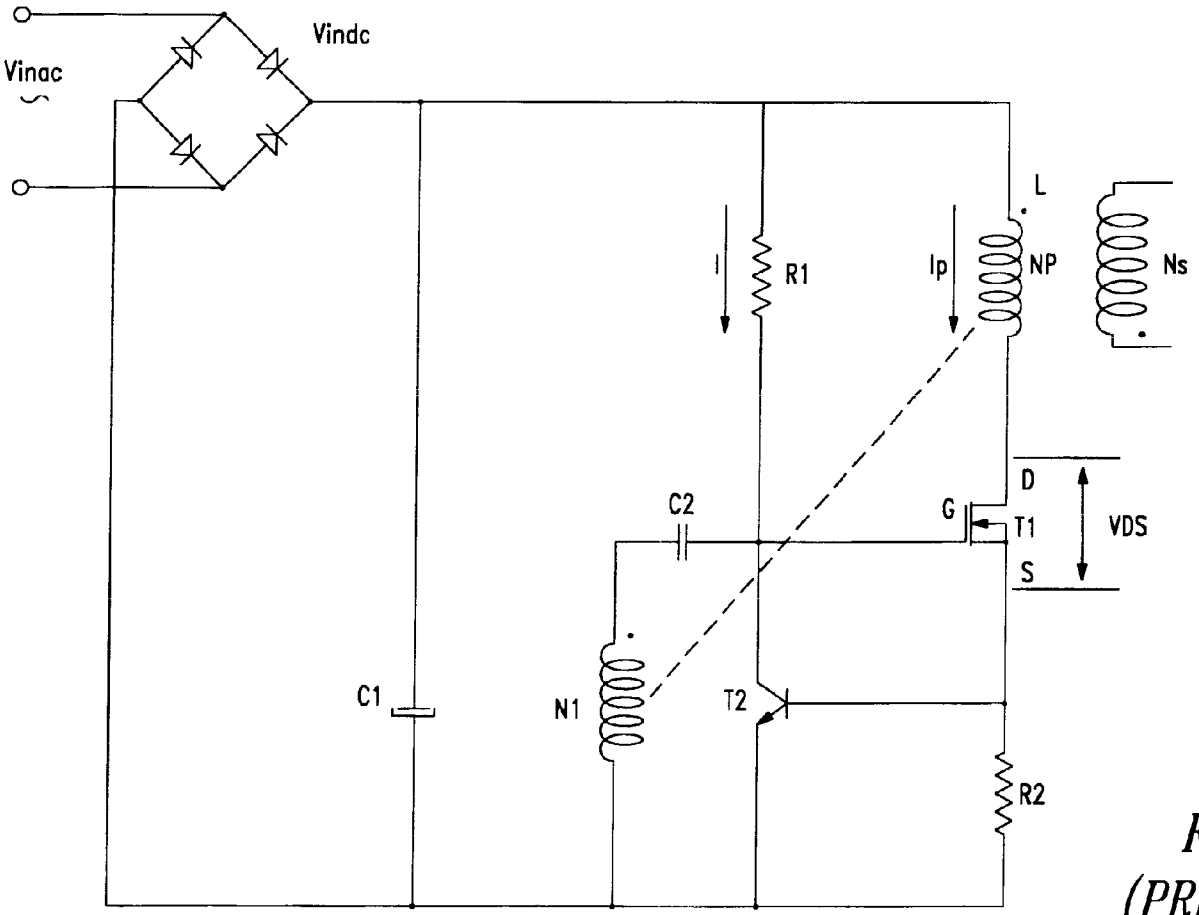
FIG. 1 (PRIOR ART)
FIG. 1 shows, as already mentioned above, a basic scheme of a self-oscillating primary circuit
Figure 3:
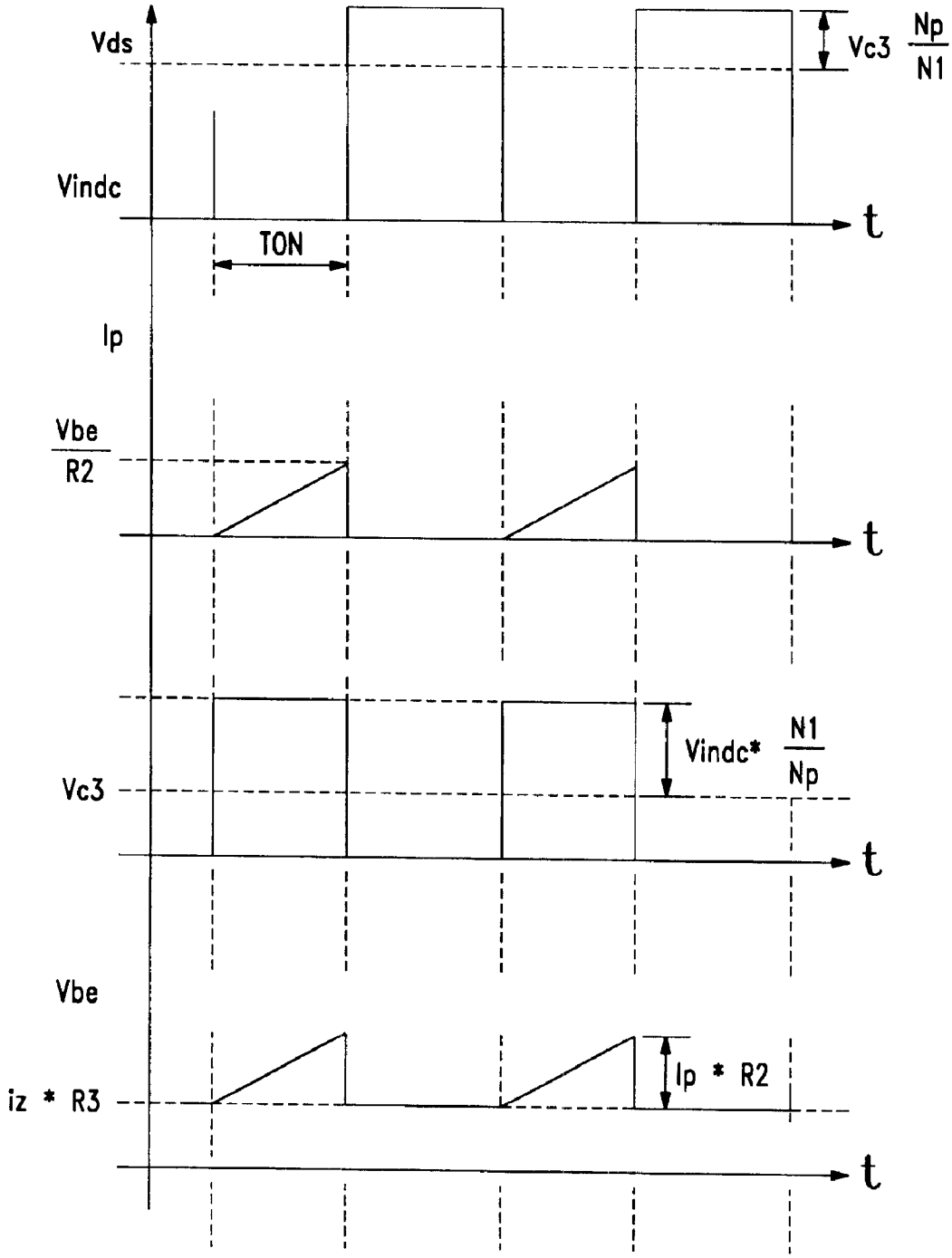
FIG. 3 shows, as already mentioned above, the typical waveforms of the flyback converter.

With reference to the diagram of FIG. 2 and to the waveforms shown in FIG. 3, during a phase of operation where the transistor T1 conducts $T_{ON}$, the voltage between the cathode of the diode D1 and the ground node of the circuit is positive and therefore the diode is not conductive and the positive voltage contributes to keep the transistor T1 in a state of conduction by means of the capacitor C2.

During the subsequent flyback phase, when the transistor T1 is not conductive, the voltage on the diode D1 cathode becomes negative and a recirculation current $I_{S1}$ can circulate in the loop composed of the diode D1, the winding N1 and the capacitor C3. Therefore, the capacitor C3 is charged by the recirculation current $I_{S1}$ and the voltage on it rises. By calling $V_Z$ the voltage of the zener diode D2, when the following condition is fulfilled:

$$V_{C3}=V_Z+V_{BE} \tag{3}$$

the diode D2 begins to conduct, thus forcing a current through the resistance R3.

By calling $i_Z$ the current that flows through the diode D2, the equation of the recirculation loop that includes the base-emitter junction of the transistor [D2] *T2* and the resistances R2 and R3 becomes:

$$V_{BE}=i_Z \cdot R_3+I_P \cdot R_2 \text{ for } R_3 >> R_2 \tag{4}$$

If $i_Z$ increases due to an increment of the voltage $V_{C3}$ reached by the capacitor C3 when charging, $I_P$ and consequently $T_{ON}$ must proportionally decrease in value in accordance with equation (2). Therefore, a lower amount of energy will be stored in the inductance L of the primary winding of the transformer and, as a consequence, a lower recirculation current $I_{S1}$ will flow during the next flyback phase in order to keep the voltage $V_{C3}$ constant and equal to a value given by $V_Z+V_{BE}$.

Thus, during a flyback phase, the voltage applied to the N1 winding is constant and equal to:

$$V_{S1}=V_{C3}+V_{D1} \tag{5}$$

where $V_{D1}$ represent the voltage drop through the diode D1 when conducting.

Even the voltage $V_{S2}$ that develops on the secondary winding $N_S$ of the transformer will be constant during the flyback phase and will have a value given by:

$$\frac{V_{S2}}{V_{S1}} = \frac{N_S}{N_1} \tag{6}$$

by combining equations (3), (5) and (6), we obtain:

$$V_{S2} = (V_Z + V_{BE} + V_{D1}) \cdot \frac{N_S}{N_1} \tag{7}$$

and the output voltage $V_{OUT}$ becomes:

$$V_{OUT} = (V_2 + V_{BE} + V_{D1}) \cdot \frac{N_S}{N_1} - V_{D3} \tag{8}$$

wherein $V_{D3}$ indicates the voltage drop on the diode D3 when conducting.

Equation (8) contains only constant terms therefore the resulting output voltage $V_{OUT}$ will be constant too. In particular, if $N_2=N_1$ and $V_{D1}=V_{D3}$, the output voltage becomes:

$$V_{OUT}=V_Z+V_{BE}=V_{C3} \tag{9}$$

Therefore the above described circuit permits the regulation of the output voltage of the secondary side circuit of the transformer-type DC—DC converter by implementing the necessary control in the primary side circuit of the converter by the addition of only three components, namely: D1, D2 and C3, according to the embodiment shown.

In practice, by the addition of the components D1 and C3, a recirculation loop is realized for a discharge current of the energy stored in the auxiliary winding N1 of the self-oscillation circuit, which substantially replicates the secondary side output loop of the converter. By means of the zener diode D2, a current $i_Z$ is then injected on the driving node of the transistor T2, the current is representative of the charge level reached by the inductance of the auxiliary winding N1 of the self-oscillation circuit, during a phase of conduction of the switch [D1] *T1*. This current $i_Z$ produces a voltage drop on the resistance R3, which is in turn summed to the voltage drop $I_P \cdot R2$ during the conduction phase of the switch T1, thus regulating the turn-on interval $T_{ON}$ and therefore the energy stored in the inductance L of the primary winding of the transformer.

The system is perfectly capable of regulating the output voltage $V_{OUT}$ upon the changing of the input voltage $V_{INDC}$ as well as of the output current $I_{OUT}$.

In fact, if the output current increases, a larger amount of energy must be transferred from the primary winding $N_P$ to the secondary winding $N_S$ during the flyback phase so that a lower amount of energy remains available from the inductance of the auxiliary winding N1 to charge the capacitor C3. Therefore the voltage reached by C3 upon charging will be lower. As a consequence, the current $i_Z$ will also be lower and the current $I_P$ will proportionally increase in order to fulfill the following equation:

$$V_{BE}=i_Z \cdot R_3+I_P \cdot R_2 \text{ for } R_3 >> R_2$$

The increase of the current $I_P$ increments the energy stored in the inductance L of the primary winding $N_P$ and this increased energy will be available during the flyback phase. Therefore the system is capable to supply the additional energy required by the rise of the output current $I_{OUT}$, thus keeping constant the output voltage $V_{OUT}$.

The way the increase of the output current $I_{OUT}$ provokes an increase of the conduction interval $T_{ON}$ of the switch T1, and therefore a consequent reduction of the converter switching frequency, to allow the current $I_P$ to reach a higher peak value should be remarked.

I claim:

1. A self-oscillating, DC—DC converter, comprising:

a transformer having a primary winding coupled to a primary circuit and a secondary winding coupled to a secondary circuit, said primary circuit including a [first] switch, functionally connected in series with the primary winding, having a first terminal thereof coupled to an input node;

a sensing resistance functionally connected between said [first] switch and a common potential node of the circuit, said [first] switch being driven by a self-oscillation circuit composed of at least an auxiliary winding having a first and a second terminal magnetically coupled to said primary winding and a first capacitor connected between a control element of said [first] switch and an intermediate connection node between said auxiliary winding and said first capacitor;

a [second switch] *device* capable of [shortcircuiting said control element of] *deactivating* said [first] switch [to said common potential node] when a current through the primary winding reaches a preestablished level;

at least a second capacitor connected between a second terminal of said auxiliary winding and said common potential node;

at least a diode having an anode coupled to said common potential node and a cathode coupled to said intermediate connection node; and at least a zener diode connected between said second terminal of said auxiliary winding and a control element of said [second switch] *device*.

2. The self-oscillating, DC—DC converter, according to claim 1 wherein said [first] switch is an isolated-gate, field effect device and said [second switch] *device* is bipolar NPN transistor.

3. A DC—DC voltage regulating circuit, comprising:

an input voltage terminal;

a [first] switch;

a primary winding serially coupled between said input voltage terminal and said [first] switch;

a secondary winding magnetically coupled to said primary winding;

a sensing resistance serially coupled between said [first] switch and a common potential node; and a self-oscillation circuit coupled to a first control terminal of said [first] switch, wherein said self-oscillation circuit comprises an auxiliary winding magnetically coupled to said primary winding and having a first node and a first intermediate node;

a first capacitive element coupled between said first node and said common potential node;

a first diode having an anode coupled to said common potential node and a cathode coupled to said first intermediate node;

a second capacitive element coupled between said first intermediate node and said first control terminal of said [first] switch;

a first resistive element coupled between said input voltage terminal and said first control terminal of said [first] switch;

a [second switch] *device* coupled between said first control terminal of said [first] switch and said common potential node and having a second control terminal coupled to a second intermediate node connecting said [first] switch and said sensing resistance; and a second diode coupled between said first node and said second control terminal.

4. The circuit of claim 3 wherein said [second switch] *device* is a bipolar NPN transistor.

5. The circuit of claim 3 wherein said second diode is a zener diode.

6. The circuit of claim 3 wherein said self-oscillation circuit further includes means for summing a signal representative of the level of the energy stored in said auxiliary winding with a control signal provided to said first control terminal of said [first] switch.

7. The circuit of claim 3, further including a filtering capacitive element coupled between said input voltage terminal and said common potential node.

8. The circuit of claim 3, wherein said [second switch shortcircuits said first control terminal to said common potential node] *device deactivates said switch* when a current through the primary winding reaches a predetermined level.

9. The circuit of claim 3, further including a third resistive element coupled between said second control terminal and said second intermediate node.

10. The circuit of claim 3 wherein said [first] switch is an isolated-gate, field effect device.

*11. A power-supply circuit, comprising:*

*an output terminal;*

*a transformer having a primary winding, having an auxiliary winding, and having a secondary winding coupled to the output terminal and operable to generate an output voltage on the output terminal;*

*a device having a variable conductivity and operable to control a flow of current through the primary winding; and*

*a regulation circuit including the auxiliary winding and a sense element coupled to the device and operable to conduct the current the regulation circuit operable to maintain the output voltage at a constant or an approximately constant level by coupling a regulation signal to the sense element during a period in which the device has a high conductivity.*

*12. The power-supply circuit of claim 11 wherein the primary and auxiliary windings are electrically isolated from the secondary winding.*

*13. The power-supply circuit of claim 11, further comprising an input terminal coupled to the primary winding and operable to receive an unregulated AC power signal.*

*14. The power-supply circuit of claim 11 wherein the device comprises an N-channel MOS transistor.*

*15. The power-supply circuit of claim 11 wherein the regulation circuit is operable to generate the regulation signal.*

*16. The power-supply circuit of claim 11 wherein the regulation circuit controls the conductivity of the device by periodically varying the conductivity of the device from the high conductivity to a low conductivity at a frequency that is proportional to a flyback signal generated across the primary winding when the device has the low conductivity.*

*17. The power-supply circuit of claim 11 wherein the regulation circuit controls the conductivity of the device by periodically varying the conductivity of the device from the high conductivity to a low conductivity at a frequency that is proportional to a flyback signal generated across the auxiliary winding when the device has the low conductivity.*

*18. The power-supply circuit of claim 11 wherein:*

*the secondary winding is operable to provide an output current to the output terminal; and the regulation circuit controls the conductivity of the device by periodically varying the conductivity of the device from the high conductivity to a low conductivity at a frequency that is proportional to the output current.*

*19. The power-supply circuit of claim 11 wherein the regulation signal comprises a regulation current.*

*20. A power-supply circuit, comprising:*

*an input terminal;*

*an output terminal operable to provide an output voltage;*

*a primary transformer winding coupled to the input terminal;*

*a secondary transformer winding coupled to the output terminal, the secondary transformer winding being electrically isolated from and magnetically coupled to the primary transformer winding;*

*a switching device having a first drive terminal coupled to the primary transformer winding, having a second drive terminal, and having a control terminal; and*

*a regulation circuit comprising,*

*an auxiliary transformer winding that is electrically isolated from the secondary transformer winding and that is magnetically coupled to the primary and secondary transformer windings,*

*a sense element coupled to the second drive terminal of the switching device, and*

*wherein the regulation circuit is operable to regulate the output voltage by,*

*generating a regulation signal, and*

*coupling the regulation signal to the sense element while energy is being stored in the primary transformer winding.*

*21. The power-supply circuit of claim 20, further comprising a common core upon which the primary, secondary, and auxiliary transformer windings are wound.*

*22. The power-supply circuit of claim 20 wherein the device comprises an N-channel power transistor.*

*23. The power-supply circuit of claim 20 wherein:*

*the regulation signal comprises a regulation current; and*

*the regulation circuit is operable to cause the regulation current to flow through the sense element.*

*24. A method for regulating an output voltage, the method comprising:*

*storing flyback energy by allowing a charging current to flow through a primary transformer winding and through a sense element during a charging period;*

*controlling the duration of the charging period by coupling a regulating signal to the sense element during the charging period;*

*generating a primary flyback voltage across the primary transformer winding after the charging period;*

*generating an auxiliary flyback voltage across an auxiliary transformer winding in response to the primary flyback voltage;*

*generating the regulating signal from the auxiliary flyback voltage;*

*generating a secondary flyback voltage across a secondary transformer winding in response to the primary flyback voltage; and*

*generating the output voltage from the secondary flyback voltage.*

*25. The method of claim 24 wherein:*

*the regulating signal comprises a regulating current;*

*the sense element comprises an input terminal; and*

*controlling the duration of the charging current comprises summing the regulating and charging currents at the input terminal of the sense element.*

*26. The method of claim 24 wherein:*

*the regulating signal comprises a regulating current; and*

*controlling the duration of the charging current comprises causing the regulating current to flow through the sense element.*

*27. The method of claim 24, wherein:*

*the regulating signal comprises a regulating current; and*

*controlling the duration of the charging period comprises causing the regulating current to flow through the sense element.*

*28. A power-supply circuit, comprising:*

*an input terminal;*

*a supply terminal;*

*a regulated output terminal operable to provide an output voltage;*

*a primary transformer winding coupled to the input terminal;*

*a secondary transformer winding coupled to the regulated output terminal, the secondary transformer winding being electrically isolated from and magnetically coupled to the primary transformer winding;*

*a switching device having a first drive terminal coupled to the primary transformer winding, having a second drive terminal, and having a control terminal; and*

*a regulation circuit comprising,*

*an auxiliary transformer winding that has first and second terminals, that is electrically isolated from the secondary transformer winding, and that is magnetically coupled to the primary and secondary transformer windings,*

*a sense element coupled between the supply terminal and the second drive terminal of the switching device,*

*a diode coupled between the supply terminal and the first terminal of the auxiliary winding,*

*a capacitor coupled between the supply terminal and the second terminal of the auxiliary winding,*

*a transistor having a first drive terminal coupled to the supply terminal, a second drive terminal coupled to the control terminal of the switching device, and*

*a control terminal coupled to the second drive terminal of the switching device, and*

*a zener diode coupled between the second terminal of the auxiliary transformer winding and the control terminal of the transistor.*

*29. A method for generating a regulated output voltage, the method comprising:*

*storing flyback energy by allowing a charging current to flow through a primary transformer winding during a charging period;*

*controlling the duration of the charging period by combining a regulating current with the charging current during the charging period;*

*generating a primary flyback voltage across the primary transformer winding after the charging period;*

*generating an auxiliary flyback voltage across an auxiliary transformer winding in response to the primary flyback voltage;*

*generating the regulating current from the auxiliary flyback voltage;*

*generating a secondary flyback voltage across a secondary transformer winding in response to the primary flyback voltage; and*

*generating the regulated output voltage from the secondary flyback voltage.*

*30. The method of claim 29 wherein:*

*storing the flyback energy comprises reducing the impedance of a switching device coupled in series with the primary transformer winding; and*

*generating the primary flyback voltage comprises increasing the impedance of the switching device in response to the combination of the charging and regulating currents.*

*31. The method of claim 29 wherein controlling the duration of the charging period comprises summing the charging and regulating currents.*

*32. The method of claim 29 wherein:*

*controlling the duration of the charging period comprises summing the charging and regulating currents; and*

*generating the primary flyback voltage comprises increasing the impedance of a switching device coupled in series with the primary transformer winding when the sum of the charging and regulating currents equals or exceeds a predetermined value.*

* * * * *

UNITED STATES PATENT AND TRADEMARK OFFICE

CERTIFICATE OF CORRECTION

PATENT NO. : RE 37,898 E
DATED : November 5, 2002
INVENTOR(S) : Giordano Seragnoli It is certified that error appears in the above-identified patent and that said Letters Patent is hereby corrected as shown below:

Column 7,
Line 57, "conduct the current the regulation circuit operable" should read as -- conduct the current, the regulation circuit operable --.

Signed and Sealed this

Twenty-sixth Day of July, 2005

JON W. DUDAS
*Director of the United States Patent and Trademark Office*